(12) United States Patent
Goelet

(10) Patent No.: US 11,420,739 B2
(45) Date of Patent: Aug. 23, 2022

(54) AERONAUTICAL CAR AND ASSOCIATED FEATURES

(71) Applicant: JG ENTREPRENEURIAL ENTERPRISES LLC, Wilmington, DE (US)

(72) Inventor: John Goelet, Washington, DC (US)

(73) Assignee: JG ENTREPRENEURIAL ENTERPRISES LLC, Wilmington, DE (US)

( * ) Notice: Subject to any disclaimer, the term of this patent is extended or adjusted under 35 U.S.C. 154(b) by 88 days.

(21) Appl. No.: 17/002,180

(22) Filed: Aug. 25, 2020

(65) Prior Publication Data

US 2020/0385114 A1    Dec. 10, 2020

Related U.S. Application Data

(63) Continuation of application No. 15/417,198, filed on Jan. 26, 2017, now Pat. No. 10,787,256.

(Continued)

(51) Int. Cl.
*B64C 37/00*     (2006.01)
*B64D 1/16*      (2006.01)
(Continued)

(52) U.S. Cl.
CPC .............. *B64C 37/00* (2013.01); *A01G 15/00* (2013.01); *B60F 5/02* (2013.01); *B64C 3/00* (2013.01);
(Continued)

(58) Field of Classification Search
CPC ........... B64C 37/00; B64C 3/00; A01G 15/00; B60F 5/02; B64D 1/16; B64D 27/12
See application file for complete search history.

(56) References Cited

U.S. PATENT DOCUMENTS

| 3,429,507 A * | 2/1969 | Jones | A01G 15/00 239/2.1 |
| 3,441,214 A * | 4/1969 | Avignon | A01G 15/00 239/2.1 |

(Continued)

FOREIGN PATENT DOCUMENTS

| CN | 103496305 | 1/2014 |
| EP | 2969603 | 5/2017 |

(Continued)

OTHER PUBLICATIONS

European Search Report for Application No. EP 17744862, dated Oct. 23, 2019, 20 pages.

(Continued)

*Primary Examiner* — Justin M Benedik
(74) *Attorney, Agent, or Firm* — Finnegan, Henderson, Farabow, Garrett & Dunner, LLP

(57) ABSTRACT

An aeronautical car includes a ground-travel system including a drivetrain; an air-travel system including a detachable portion configured to house a propulsion device configured to provide thrust and to be driven by the drivetrain when the detachable portion is connected to the aeronautical car, and at least one flight mechanism configured to provide lift once the aeronautical car is in motion; and a weather manipulation device. The weather manipulation device may be configured to manipulate at least one aspect of a weather condition while the aeronautical car is in the air.

19 Claims, 11 Drawing Sheets

Related U.S. Application Data

(60) Provisional application No. 62/288,916, filed on Jan. 29, 2016.

(51) Int. Cl.
| | |
|---|---|
| *A01G 15/00* | (2006.01) |
| *B60F 5/02* | (2006.01) |
| *B64C 3/00* | (2006.01) |
| *B64D 27/12* | (2006.01) |
| *B60K 16/00* | (2020.01) |

(52) U.S. Cl.
CPC ............. *B64D 1/16* (2013.01); *B64D 27/12* (2013.01); *B60K 16/00* (2013.01); *B60K 2016/003* (2013.01); *B60Y 2200/11* (2013.01); *B60Y 2200/51* (2013.01); *B60Y 2400/216* (2013.01); *B64D 2211/00* (2013.01); *Y02T 10/90* (2013.01); *Y02T 50/50* (2013.01)

(56) References Cited

U.S. PATENT DOCUMENTS

| | | | | |
|---|---|---|---|---|
| 5,505,407 | A * | 4/1996 | Chiappetta | B64C 29/0025 244/2 |
| 5,746,390 | A * | 5/1998 | Chiappetta | B64C 29/0025 244/12.2 |
| 6,086,014 | A * | 7/2000 | Bragg, Jr. | B64C 37/00 244/2 |
| 6,568,630 | B2 * | 5/2003 | Yoeli | B64C 11/001 244/12.3 |
| 6,824,095 | B2 * | 11/2004 | Mao | B64C 37/00 244/12.5 |
| 6,886,776 | B2 * | 5/2005 | Wagner | B64C 27/20 244/12.4 |
| 7,159,817 | B2 * | 1/2007 | VanderMey | B64C 29/0016 244/12.1 |
| 7,472,863 | B2 * | 1/2009 | Pak | A63H 27/14 244/12.5 |
| 7,857,253 | B2 | 12/2010 | Yoeli | |
| 7,874,512 | B2 * | 1/2011 | Xu | B60F 5/02 244/2 |
| 7,938,358 | B2 | 5/2011 | Dietrich et al. | |
| 8,016,226 | B1 * | 9/2011 | Wood | B64C 29/0033 244/23 A |
| 8,162,253 | B2 | 4/2012 | Seiford, Sr. | |
| 8,205,820 | B2 | 6/2012 | Goossen et al. | |
| 8,210,473 | B2 | 7/2012 | Schweighart | |
| 8,267,347 | B2 | 9/2012 | Goldshteyn | |
| 8,371,520 | B2 | 2/2013 | Easter | |
| 8,511,603 | B2 | 8/2013 | Blomeley | |
| 8,528,852 | B2 | 9/2013 | Farrag | |
| 8,616,492 | B2 * | 12/2013 | Oliver | B64C 29/0075 244/12.4 |
| 8,646,720 | B2 * | 2/2014 | Shaw | B64C 29/0025 244/17.23 |
| 8,708,273 | B2 * | 4/2014 | Oliver | B64C 29/0033 244/12.4 |
| 8,733,690 | B2 * | 5/2014 | Bevirt | B64C 29/0033 244/12.4 |
| 8,800,912 | B2 * | 8/2014 | Oliver | B64C 39/08 244/12.4 |
| 8,827,200 | B2 * | 9/2014 | Radu | B60F 5/02 244/2 |
| 8,991,740 | B2 | 3/2015 | Olm et al. | |
| 9,045,226 | B2 * | 6/2015 | Piasecki | B64C 27/32 |
| 9,108,728 | B2 * | 8/2015 | Shaw | B64C 27/20 |
| 9,187,174 | B2 * | 11/2015 | Shaw | B64C 27/28 |
| 9,555,681 | B2 * | 1/2017 | Klein | B60F 5/003 |
| 9,567,016 | B2 * | 2/2017 | Magee | B62D 35/001 |
| 9,776,715 | B2 * | 10/2017 | Zhou | B64C 29/0075 |
| 10,081,424 | B2 * | 9/2018 | Radu | B64C 29/0033 |
| D843,305 | S * | 3/2019 | MacAndrew | D12/319 |
| 10,252,798 | B2 * | 4/2019 | Petrov | B64C 37/00 |
| 2001/0019090 | A1 * | 9/2001 | Horev | B64D 1/18 244/136 |
| 2003/0062443 | A1 * | 4/2003 | Wagner | B64C 27/20 244/12.3 |
| 2003/0080242 | A1 * | 5/2003 | Kawai | F02K 3/025 244/12.4 |
| 2003/0085296 | A1 * | 5/2003 | Waxmanski | A01G 15/00 239/2.1 |
| 2004/0026563 | A1 * | 2/2004 | Moller | B64C 3/56 244/12.4 |
| 2005/0242231 | A1 * | 11/2005 | Yoeli | B64C 29/0025 244/23 R |
| 2006/0226281 | A1 * | 10/2006 | Walton | B64C 29/0033 244/17.23 |
| 2010/0001089 | A1 * | 1/2010 | Vazquez Serrano | A01G 15/00 239/2.1 |
| 2010/0002353 | A1 * | 1/2010 | Barinov | H05F 1/00 361/212 |
| 2010/0051739 | A1 | 3/2010 | Liu | |
| 2010/0051742 | A1 | 3/2010 | Schweighart et al. | |
| 2011/0042507 | A1 * | 2/2011 | Seiford, Sr. | B60F 5/02 244/2 |
| 2011/0192931 | A1 | 8/2011 | Jung | |
| 2011/0198436 | A1 | 8/2011 | Liu et al. | |
| 2011/0315806 | A1 | 12/2011 | Piasecki et al. | |
| 2012/0241554 | A1 * | 9/2012 | Davidson | A01G 15/00 244/30 |
| 2013/0112804 | A1 | 5/2013 | Zhu | |
| 2013/0126666 | A1 | 5/2013 | Brown | |
| 2013/0131507 | A1 | 5/2013 | Salazar-Ferrer et al. | |
| 2013/0193263 | A1 | 8/2013 | Schweighart et al. | |
| 2014/0014764 | A1 | 1/2014 | Lundgren | |
| 2014/0124612 | A1 | 5/2014 | Bitar | |
| 2014/0291440 | A1 | 10/2014 | Stekelenburg | |
| 2015/0028150 | A1 | 1/2015 | Klein | |
| 2015/0102154 | A1 | 4/2015 | Duncan et al. | |
| 2015/0102155 | A1 | 4/2015 | Krastev | |
| 2015/0136898 | A1 | 5/2015 | McCoy | |
| 2015/0359184 | A1 * | 12/2015 | Goelet | B64B 1/06 244/30 |

FOREIGN PATENT DOCUMENTS

| | | |
|---|---|---|
| WO | WO 2007/114877 | 10/2007 |
| WO | WO 2014/144001 | 9/2014 |

OTHER PUBLICATIONS

Aeromobile (Fixed Wing), Press release dated Apr. 11, 2014, 38 pages.
Vijaenthiran, Viknesh, "Aeromobil Flying Car Crashes During Test Flight," Fox News Press Release dated May 11, 2015, 1 page.
Fitzgerald, Paul, "Aeromobil Unveils the Flying Roadster," Inventor Spot, Jun. 5, 2005, 7 pages.
Kingsley, Jeremy, "The Flying Car May Have Just Landed," Aeromobil, dated Sep. 24, 2014, 3 pages.
Davies, Alex, Butterfly Aircraft (Fixed Wing), "A $75,000 Flying Tricycle Can Hit 35 MPH," Business Insider, Dec. 5, 2012, 2 pages.
Akerman, Evan, "Lockheed Martin Developing Flying Robotic Car Carrier," IEEE Spectrum, Aug. 19, 2013, 7 pages.
Nateog, "Lockheed Martin Building a Car-Transporting Drone for DARPA," The Verge, Aug. 19, 2013, 4 pages.
Miller International (Flexible Wing), Press Release dated 2012, 6 pages.
Murray, Peter, Pal-V One—The Car-Plane That's Easy to Fly and Cheap—We're Kidding About the Cheap Part, Singularity HUB, Aug. 3, 2012, 5 pages.
Hillister, Sean, "Terrafugla's Street-Legal Prototype Flying Car Makes Maiden Flight," The Verge, Apr. 2, 2012, 3 pages.
"X-Hawk," UrbanAero, Press Release dated Jun. 5, 2015, 3 pages.
http://www.xplorair.com, Press Release dated Jun. 5, 2015.

(56) References Cited

OTHER PUBLICATIONS

TBM, "Here Come the Flying Cars," TBM Magazine, Summer 2015, pp. 36-39.

* cited by examiner

AERONAUTICAL CAR AND ASSOCIATED FEATURES

PRIORITY CLAIM

This application is a continuation of and claims the benefit to U.S. application Ser. No. 15/417,198, filed Jan. 26, 2017, which claims priority from U.S. Provisional Patent Application No. 62/288,916, filed on Jan. 29, 2016. The entire disclosure of each of the foregoing applications is incorporated by reference in the present application.

TECHNICAL FIELD

The present disclosure is directed to an aeronautical car and, more particularly, an aeronautical car and associated features.

BACKGROUND

In the recent past, the concept of a flying car has gone from a futuristic prediction to an upcoming reality. Today, there are many examples of aeronautical vehicles that have dual capability to both drive on the ground and fly in the air. In general, these vehicles include one or more propulsion devices that may be used to propel the vehicle on the ground and/or to lift the vehicle off of the ground. For example, current aeronautical vehicles include engines, wings, propellers, etc., which provide the vehicle with the dual capability. Some of these vehicles include vertical take-off and landing (VTOL) capability, while others require a runway to have sufficient space to transfer between land and air.

Current aeronautical cars suffer from drawbacks, however, that may prevent the vehicles from being used in some situations where the features of an aeronautical car are advantageous. Further, there are many features that prior aeronautical cars have not contemplated, including certain features, such as those providing weather manipulation capabilities, that are particularly well-suited for use in combination with an aeronautical car.

SUMMARY

The present disclosure is directed to an aeronautical vehicle that includes a ground-travel system, an air-travel system, and a weather manipulation device.

It is to be understood that both the foregoing general description and the following detailed description are exemplary and explanatory only and are not restrictive of the invention.

DETAILED DESCRIPTION

Reference will now be made in detail to the drawings. Wherever convenient, the same reference numbers will be used throughout the drawings to refer to the same or like parts.

Figure 1:
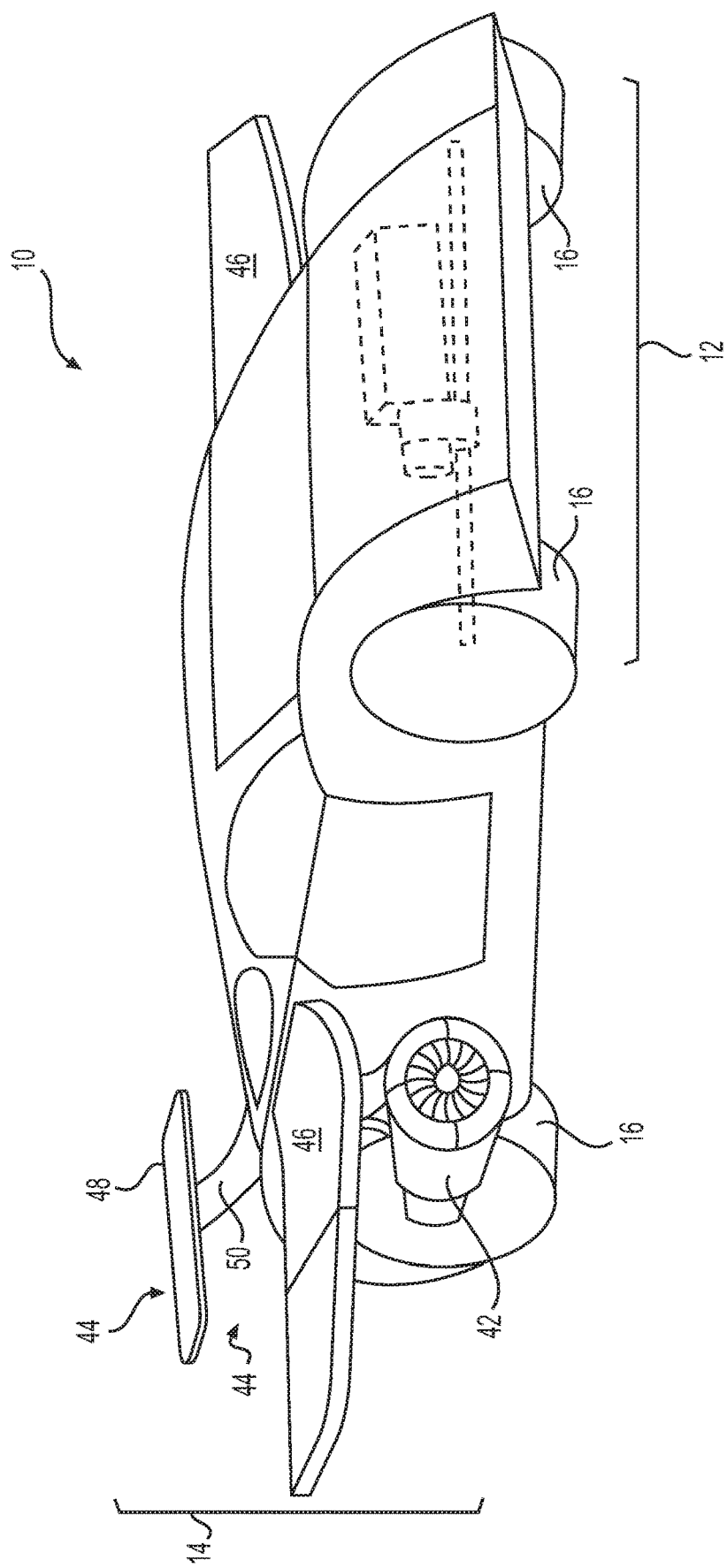
FIG. 1 illustrates an exemplary embodiment of an aeronautical car that is consistent with the present disclosure.

FIG. 1 illustrates an exemplary aeronautical car 10 that may be configured for both ground travel and air travel. Although aeronautical car 10 is depicted and described herein as a car, it is understood that aeronautical car 10 may embody other types of aeronautical vehicles that are configured for both ground and air travel (e.g., aeronautical trucks, vans, utility vehicles, etc.). Aeronautical car 10 may include a ground-travel system 12 that allows aeronautical car 10 to be driven on the ground and an air-travel system 14 that allows aeronautical car 10 to fly and/or hover above the ground. It should be understood that the below described features of aeronautical car 10 are exemplary, and that additional or alternative features configured to allow aeronautical car 10 to be a dual-purpose vehicle with the capability of driving on the ground and flying in the air are possible.

Ground-travel system 12 may include one or more features configured to allow aeronautical car 10 to travel on the ground in a manner similar to a typical car. For example, ground-travel system 12 may include a plurality of traction devices 16 (e.g., 4 traction devices) configured to support aeronautical car 10 and allow aeronautical car 10 to be propelled along a ground surface. Although many known cars typically include four wheels, it is understood that the plurality of traction devices 16 may include any number of traction devices 16 that allow aeronautical car 10 to be effectively driven and maneuvered on a ground surface in a desired manner. For instance, aeronautical car may include two, three, four, six, or more traction devices 16, as desired, to achieve certain performance characteristics (e.g., handling, stability, load bearing capacity, etc.).

Each traction device 16 may include features and be configured in a manner that allows aeronautical car 10 to traverse various types of ground surfaces, including those on and off established roads and under various conditions. For example, traction devices 16 may include wheels and tires sized to provide traction and stable control for aeronautical car 10 while traveling on the ground. Traction devices 16 may be configured to allow aeronautical car 10 to maneuver around curves, up and down hills, on rough terrain, over loose or slick ground, on highways, in traffic, etc.

Figure 2:
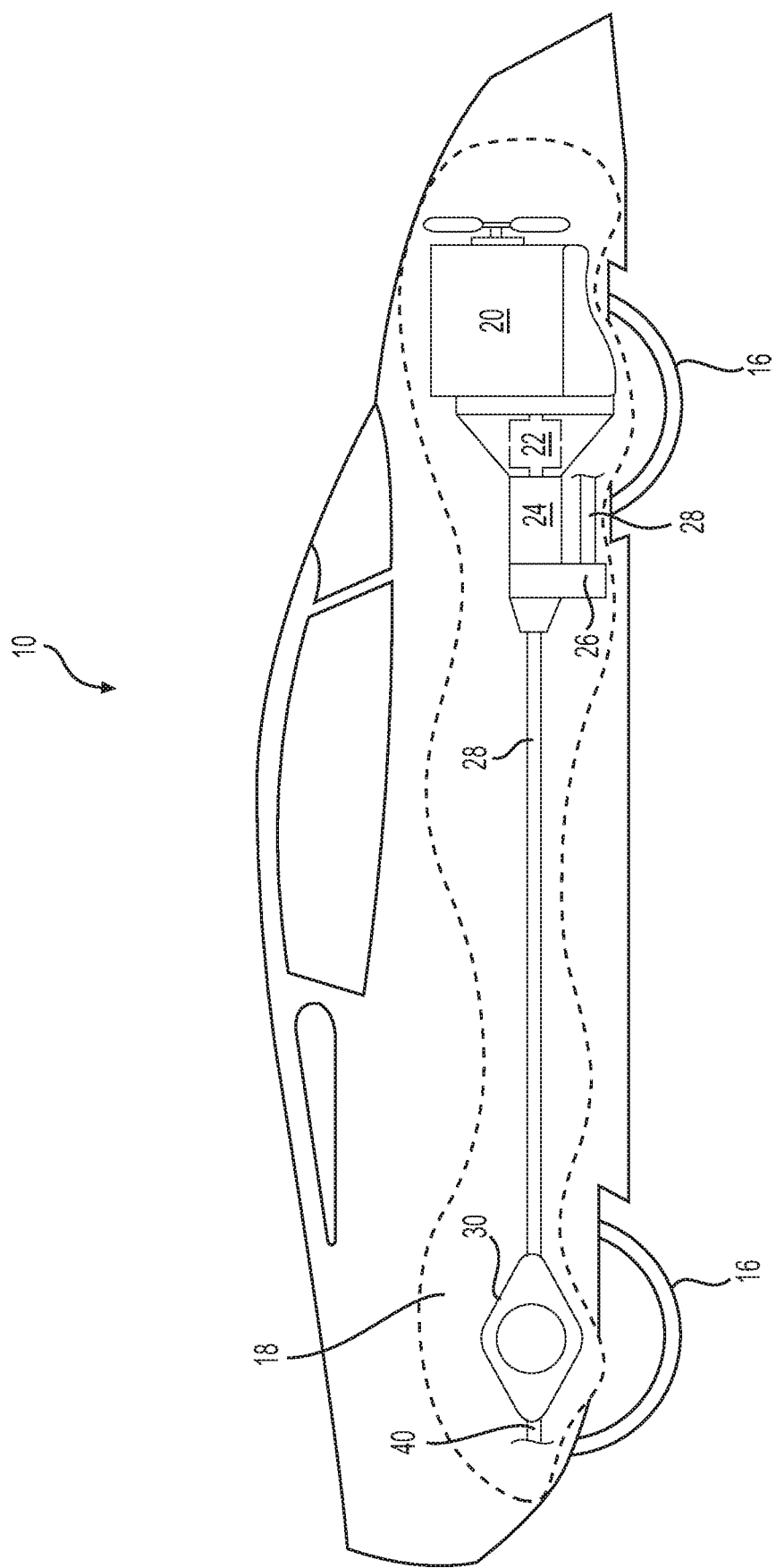
FIG. 2 illustrates an exemplary drive system that may be included in an aeronautical car that is consistent with the present disclosure.

As shown in FIG. 2, ground-travel system 12 may also include a drivetrain 18 operatively connected to and configured to drive one or more of traction devices 16 for propelling aeronautical car 10 on the ground. Drivetrain 18 may be driven by a power source 20 and operatively connected to one or more traction devices 16 via a plurality of drivetrain components. Drivetrain components may include, among other things, an engagement device 22 (e.g., a clutch, a torque converter, etc.), a transmission 24, a transfer case 26, one or more drive shafts 28, a front differential (not shown), and/or a rear differential 30. It is understood that ground-travel system 12 may be configured in a different manner than the exemplary configuration shown in FIG. 2. For example, drive system 12 may be configured as a rear-wheel drive system, a front-wheel drive system, a four-wheel drive system, an all-wheel drive system, or in another type of configuration. It is further noted that drive system 12 may include more, fewer, or other drivetrain components than those described herein.

Power source 20 may be a device or system configured to convert energy from a first form (e.g., a form that can be easily stored) to a second form (e.g., kinetic energy) that can be used to drive traction devices 16 in a controllable manner. For example, in some embodiments, power source 20 may be an internal combustion engine, such as a reciprocating piston engine, a rotary engine (e.g., a Wankel engine), or a turbine engine, that is configured to burn a mixture of air and fuel (e.g., gasoline, diesel fuel, propane, natural gas, jet fuel, etc.) to produce a rotational mechanical output. In other embodiments, power source 20 may be an electric power source and include one or more electric motors, storage devices (e.g., batteries), and drive/supply circuitry.

Figure 3:
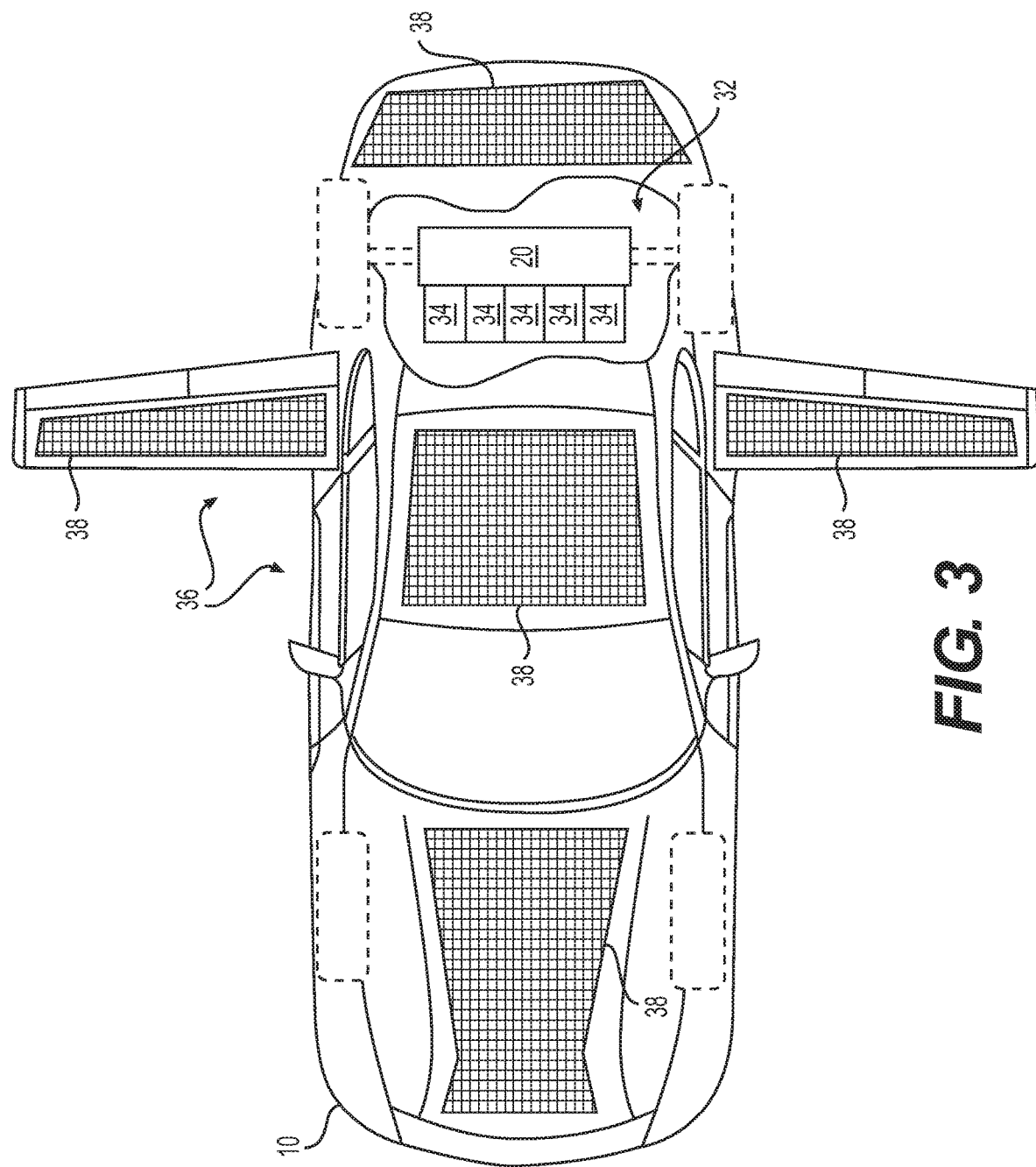
FIG. 3 illustrates another exemplary drive system that may be included in an aeronautical car that is consistent with the present disclosure.

For example, as shown in FIG. 3, aeronautical car 10 may include an electrical power system 32 configured to configured to provide electrical energy to power source 20 and/or other devices and systems associated with aeronautical car 10. Electrical power system 32 may be configured to store and supply an amount of electrical energy that is sufficient to allow aeronautical car 10 to effectively drive on the ground and fly in the air for a period of time. In some embodiments, electrical power system 32 may be configured to provide enough power to allow aeronautical car 10 to rely entirely on electrical power for driving and flight propulsion.

Electrical power system 32 may include one or more energy storage devices 34 configured to store electrical energy. For example, electrical power system 32 may include a plurality of batteries, capacitors, and/or other electrical storage devices configured to receive, store, and release electrical energy. Energy storage devices 34 may be electrically connected to power source 20 and/or other propulsion devices associated with air-travel system 14 for supplying propulsion power. For example, power source 20 may be part of a fully electric drive system or a hybrid drive system (e.g., including both a combustion engine and drive motor) that is powered by electrical power system 32. Electrical power system 32 may also or alternatively be connected to electrical air propulsion devices, such as motor-driven rotors, propellers, fans, etc., that are configured to provide propulsion for air travel.

In some embodiments, electrical power system 32 may further include a mechanism for collecting and storing energy. For example, electrical power system 32 may include a solar energy system 36. Solar energy system 36 may include a plurality of solar panels 38 disposed on one or more portions of aeronautical car 10 in a variety of different configurations. Persons of ordinary skill in the art will recognize the requirements of solar panels suitable for the applications disclosed herein. Further, the disclosed configurations and placement of solar panels shown and discussed herein are not intended to be limiting, and persons of ordinary skill in the art will understand that additional embodiments are possible.

Solar energy system 36 may be electrically connected to electrical power system 32 in order to store energy collected by solar panels 38. Solar energy collected via solar panels 38 may be stored in electrical power system 32 and distributed to various systems or devices of aeronautical car 10 (e.g., power source 20, lighting systems, control systems, gauges and instruments, entertainment devices, etc.). In some embodiments, solar energy system 36 may be configured to provide electrical power directly to power source 20. For example, solar energy system 36 may be configured to directly supply electrical energy to power source 20 via dedicated circuitry for immediate use (e.g., to produce mechanical energy). In other embodiments, solar energy system 36 may be additionally or alternatively configured to supply power to power source 20 via circuitry associated with electrical power system 32. For example, energy collected by solar panels may be stored within energy storage device 34 prior to distribution to power source 20 and/or other devices or systems of aeronautical car 10.

In some situations, such as when aeronautical car 10 is exposed to sunlight and/or during certain operations of aeronautical car 10 that may not require large amounts of power, aeronautical car 10 may run exclusively on solar power from solar energy system 36. When solar panels 38 absorb more electrical energy than is being consumed by aeronautical car 10 (e.g., during low energy consumption or when a combustion engine is predominantly powering aeronautical car 10), electrical energy converted from sunlight by solar panels 38 may be used to charge electrical power system 32. That is, electrical energy collected via solar panels 38 may be stored for later use within energy storage devices 34. In this way, aeronautical car 10 may be configured to rely on electrical power for ground and air travel for extended periods of time, including certain amounts of time during which sunlight is not currently available.

Persons of ordinary skill in the art will recognize suitable operative connections between power source 20, electrical power system 32, and solar energy system 36, according to the arrangements described above.

Returning to FIG. 2, power source 20 may be configured to engage the other components of drivetrain 18 via engagement device 22. In some embodiments, engagement device 22 may include one or more clutches configured to be manually actuated (e.g., via a mechanical and/or hydraulic system) or automatically actuated (e.g., via an electro-mechanical and/or electro-hydraulic system) for engaging or disengaging power source 20 from the rest of drivetrain 18. In other embodiments, engagement device 22 may be a hydraulic device, such as a hydraulic torque converter. In other embodiments of aeronautical car 10, drivetrain 18 may not include engagement device 22.

Transmission 24 may be configured to allow a speed ratio between power source 20 and traction devices 16 to be adjusted to allow aeronautical car 10 to be driven at a wide range of groundspeeds. Transmission 24 may also be configured to allow a rotational direction of traction devices 16 to be changed so aeronautical car 10 can be driven forward or backward. Transfer case 26 may allow power from transmission 24 to be permanently or selectively distributed between front and rear traction devices 16 via drive shafts 28. Rear differential 30 and front differential (not shown) may each include a gearing system configured to allow the rotational energy of drive shafts 28 to be transferred to traction devices 16 via rear and front axle assemblies (not shown).

In some embodiments, drivetrain 18 may include components that are configured to transfer energy from power source 20 to other systems. For example, rear differential 30 or another component associated with drivetrain 18 may be equipped with an output shaft 40 and/or other component configured to engage and drive other or additional devices. For instance, in some embodiments, drivetrain 18 may be used to drive permanent components of air-travel system 14 (referring to FIG. 1). In other embodiments, aeronautical car 10 may connectable to external devices associated with air-travel system 14 that are configured to be driven by drivetrain 18 when connected to aeronautical car 10. For example, drivetrain 18 may be configured to engage and drive one or more propellers, fans, and/or other devices configured to connect to aeronautical car 10 and propel it through the air.

It is understood that ground-travel system 12 may include other features that may be found in a typical car that provide the car with a characteristic that allows the car to be safely and effectively driven on the ground. For example, ground-travel system 12 may also include a chassis, a body, a suspension system, and a steering system. The suspension system may be mechanically or hydraulically adjustable to accommodate ground travel on different types of surfaces and to facilitate transitions between ground-travel and air-travel (and vice versa). Ground-travel system 12 may also include features that are compliant with regulatory requirements, such as, for example, emission abatement systems, exterior lighting/signaling systems, passenger restraint systems, and/or other systems or devices.

Referring again to FIG. 1, air-travel system 14 may include one or more features configured to allow aeronautical car 10 to leave the ground and travel in the air. For example, air-travel system 14 may include one or more propulsion devices 42 and one or more flight mechanisms 44. Propulsion devices 42 may be configured thrust aeronautical car 10 in one or more directions (e.g., horizontal and vertical directions), and flight mechanisms 44 may be configured to provide lift and/or steering once aeronautical car 10 is in motion.

Figure 4:
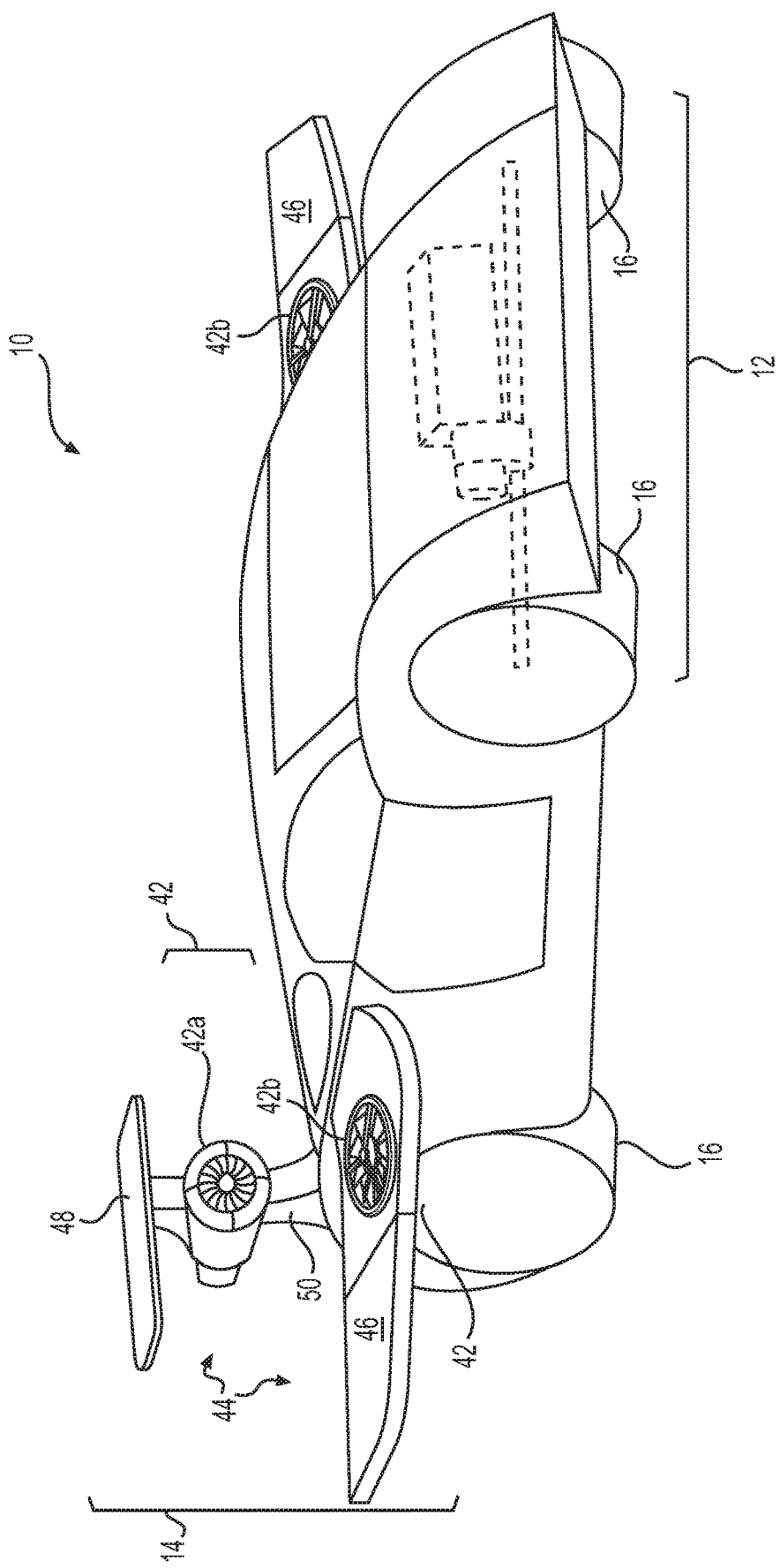
FIG. 4 illustrates another exemplary embodiment of an aeronautical car, consistent with the present disclosure.

As shown in FIG. 4, propulsion devices 42 may include mechanisms configured to thrust aeronautical car in horizontal and/or vertical directions for sustaining flight. For example, propulsion devices 42 may include one or more turbine engines 42*a*, propulsion fans 42*b*, propellers (not shown), and/or other types of rotary (e.g., having a rotor) or bladed propulsion mechanisms. Other mechanisms may include axial fans, centrifugal fans, tangential fans, reaction engines, turbojets, turbofans, rockets, ramjets, and/or pulse jets. One of ordinary skill in the art will recognize that numerous configurations may be utilized without departing from the scope of the present disclosure. Each propulsion device 42 may be fixed or adjustable (e.g., able to be tilted, rotated, turned, etc.) to allow the travel direction of aeronautical car 10 to be controlled. It is noted that propulsion devices 42 may also be used to propel and/or steer aeronautical car 10 on the ground in addition to in lieu of propulsion provided by ground-travel system 12.

Propulsion devices 42 may be integral with or attached to various parts of aeronautical car 10. For example, propulsion devices may be rigidly attached to a frame or body of aeronautical car 10. Alternatively, propulsion devices may be integral with a component of aeronautical car 10, such as a flight mechanism 44 or other component. In some embodiments, propulsion devices 42 may be attached to and extend from a portion of aeronautical car 10, such as from a top or bottom side, a front or rear side, or a lateral side. Other configurations of propulsion devices 42 may be possible.

In some embodiments, propulsion devices 42 may be configured to provide sufficient horizontal thrust to sustain flight in conjunction with flight mechanisms 44. That is, propulsion devices 42 may be configured to propel aeronautical car 10 fast enough to allow flight mechanisms 44 to generate sufficient lift and steering capability for controlled flight. In other embodiments, one or more of propulsion devices 42 may be also or alternatively be configured to provide vertical thrust to allow aeronautical car 10 to take off from the ground at lower or zero horizontal speed. That is one or more propulsion devices 42 may be configured to provide sufficient vertical thrust to permit vertical takeoff and landing (VTOL) of aeronautical car 10.

In some embodiments, one or more of propulsion devices 42 may be adjustable and otherwise configured to provide both vertical and horizontal thrust. That is, propulsion devices 42 may be adjustable to allow for thrust generation in desired directions between and including vertical and horizontal directions. Propulsion devices 42 may be associated with fixed propulsion mounts or rotatable propulsion mounts so as to provide vertical lift and/or horizontal thrust. In some embodiments, a mounting device for propulsion units 42 may include pivot assemblies configured to allow a rotation of propulsion assemblies about one or more axes in response to a control signal.

In some embodiments, propulsion devices 42 maybe configured to control or assisting in controlling yaw, pitch, and roll of aeronautical car 10 during flight. For example, multiple propulsion devices 42 may be positioned around aeronautical car 10 and configured to be manipulated to maneuver aeronautical car 10 in the air. For instance, multiple propulsion devices 42 may be positioned at multiple sides of aeronautical car 10 (e.g., left side, right side, front side, rear side, etc.), which may be used to control movements of aeronautical car 10 by adjusting one or more of a power output and thrust vector direction (e.g., by adjusting a positional orientation) of each propulsion device 42. In this way, high maneuverability of aeronautical car 10 may be achieved at high and low horizontal speeds.

In some embodiments, propulsion devices 42 may further include variable-speed and/or reversible type motors that may be run in either direction and/or at varying rotational speeds based on control signals. Propulsion devices 42 may be powered by various power supply systems, including batteries, solar energy, gasoline, diesel fuel, natural gas, methane, and/or any other suitable fuel source (e.g., an electrical power system and solar energy system to be described).

In some instances, propulsion devices 42 may be adjustable to provide for reduced or fully reversible thrust. For example, the rotational direction of each propulsion device 42 may be variable-speed and/or reversible. Each propulsion device may also or alternatively include associated airfoil components (e.g., variable-pitch propellers or blades configured to have an adjustable angle of attack. In this way, thrust intensity of each propulsion device 42 may be controlled, which may allow for controlled velocity, acceleration, and steering, based on the angle of attack of the associated airfoil components. For example, where the associated airfoil components are configured as adjustable blades, the blades may be rotated to accomplish a complete thrust reversal. The propulsion unit may also or alternatively be configured with, for example, vanes, ports, shields, and/or other devices, such that a thrust generated by the propulsion unit may be modified and directed in a desired direction. The direction of thrust may also or alternatively be reversed or otherwise adjusted by adjusting the positional orientation of each propulsion device 42.

It should be understood that propulsion devices 42 and/or power source 20 may, as a whole, include features that provide power for a driving mode and a flying mode (e.g., to accelerate aeronautical car 10 in any direction). The manner in which propulsion devices 42 and/or power source 20 functions and a degree to which they are separate or combined devices may vary across different embodiments.

Flight mechanisms 44 may be fixed or selectively and/or automatically adjustable to allow aeronautical car 10 to be maneuvered through the air in a manner similar to airplanes. For example, flight mechanisms 44 may include a pair of wings 46, which may include fixed wings or flexible wings that extend laterally from aeronautical car 10. Wings 46 may include adjustable features to accommodate controlled air travel, such as ailerons and flaps. Flight mechanisms 44 may also include a horizontal stabilizer 48, a vertical stabilizer 50, other airfoils, and/or other associated devices for maneuvering aeronautical car 10 through the air, such as rudders and elevators.

Figure 5:
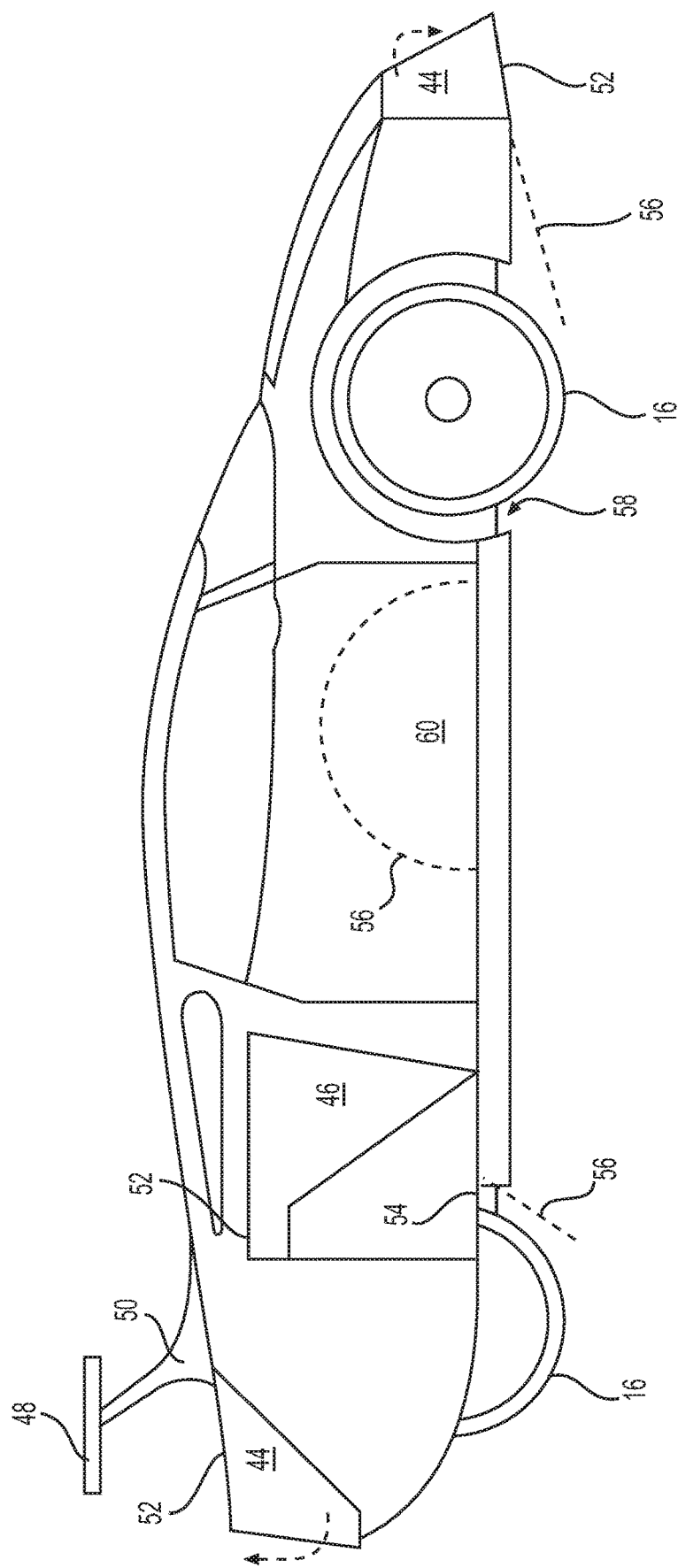
FIG. 5 illustrates an exemplary aeronautical car with features for improved flight handling and control that are consistent with the present disclosure.

As shown in FIG. 5, flight mechanisms 44 may include features that allow them to retract, fold, or otherwise move out of a flight position when aeronautical car 10 is in a driving mode. For instance, wings 46 and other flight mechanisms 44 may be connected to aeronautical car 10 via a hinging mechanism 52 or other device that allows them to fold against or into a body of aeronautical car 10. Wings 46 and other flight mechanisms 44 may also be divided into sections that are connected by joints 54 (e.g., hinges) that allow them to fold and collapse at one or more locations. Wings 46 and other flight mechanisms 44 may be configured to collapse against the body of aeronautical car 10 or into a designated compartment to reduce drag and improve the aerodynamic performance of aeronautical car 10.

To further reduce drag during flight, aeronautical car 10 may include one or more air shields 56 that are configured to block airflows or allow airflows to more efficiently pass over, under, or a round aeronautical car 10. For instance, when aeronautical car 10 is driving on the ground, traction devices 16 may be located in a wheel well that permits traction devices to be turned (e.g., left and right) to allow for proper steering of aeronautical car 10. During a flight mode, air shields 56 may be moved from a storage position (e.g., within a body panel or other compartment) to a flight position where air shield 16 may be able to partially or totally block airflows from flowing into wheel wells 58 and creating drag. Other air shields 58 may be positioned at other locations around aeronautical car 10 to guide airflows away from non-aerodynamic features, such as traction devices 16, drivetrain components, exhaust system components, and other features near the exterior of aeronautical car 10.

It is noted that wings 46, all other flight mechanisms 44, and air shields may be manually or automatically moved from a driving position (i.e., a position assumed during a driving mode) to a flight position (i.e., a position assumed during a flight mode). To facilitate transitions between driving and flight positions, each wing 46, other flight mechanism 44, and air shield 58 may include or be connected to one or more actuators that are configured to drive each component between driving and flight positions. For example, mechanical and/or hydraulic actuators may be mounted to aeronautical car 10 that attach to a respective wing 46, other flight mechanism 44, or air shield 58 for pivoting or sliding the respective component into its driving or flight position.

Figure 6:
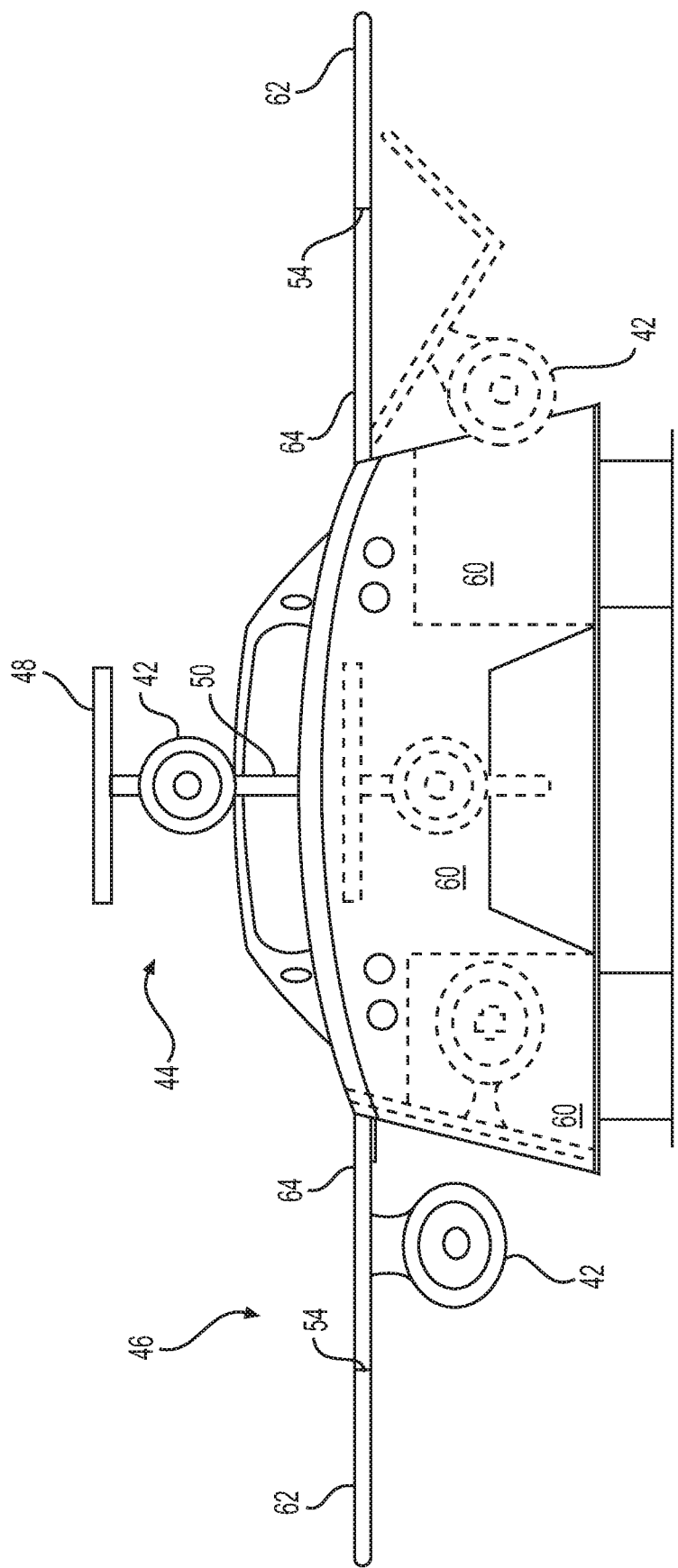
FIG. 6 illustrates an exemplary aeronautical car with retractable flight system features that are consistent with the present disclosure.

As shown in FIG. 6, flight mechanisms 44, including wings 46, horizontal stabilizer 48, vertical stabilizer 50, as well as other components that are not shown, may be configured to be stowed within internal compartments 60 of aeronautical car 10 when in a driving mode. For example, to allow wings 46 to be fully stowed during a driving mode, wings 46 may be configured to collapse at one or more joints 54 that allow each wing 46, once collapsed, to fit within a designated compartment 60. Although each wing 46 in FIG. 6 is shown with one joint 54, it is understood that wings 46 may include a number of joints to allow for more compact stowage. Other flight mechanisms 44, such as horizontal stabilizer 48 and vertical stabilizer 50, may not collapse at joints and may instead be configured to slide into and out of a designated compartment 60 intact. In some embodiments, compartments 60 may be sized to accommodate propulsion devices 42 that are attached to wings 46 or other flight mechanisms 44. In this way, propulsion devices 42 may be protected from damage when not in use during driving mode.

Figure 7:
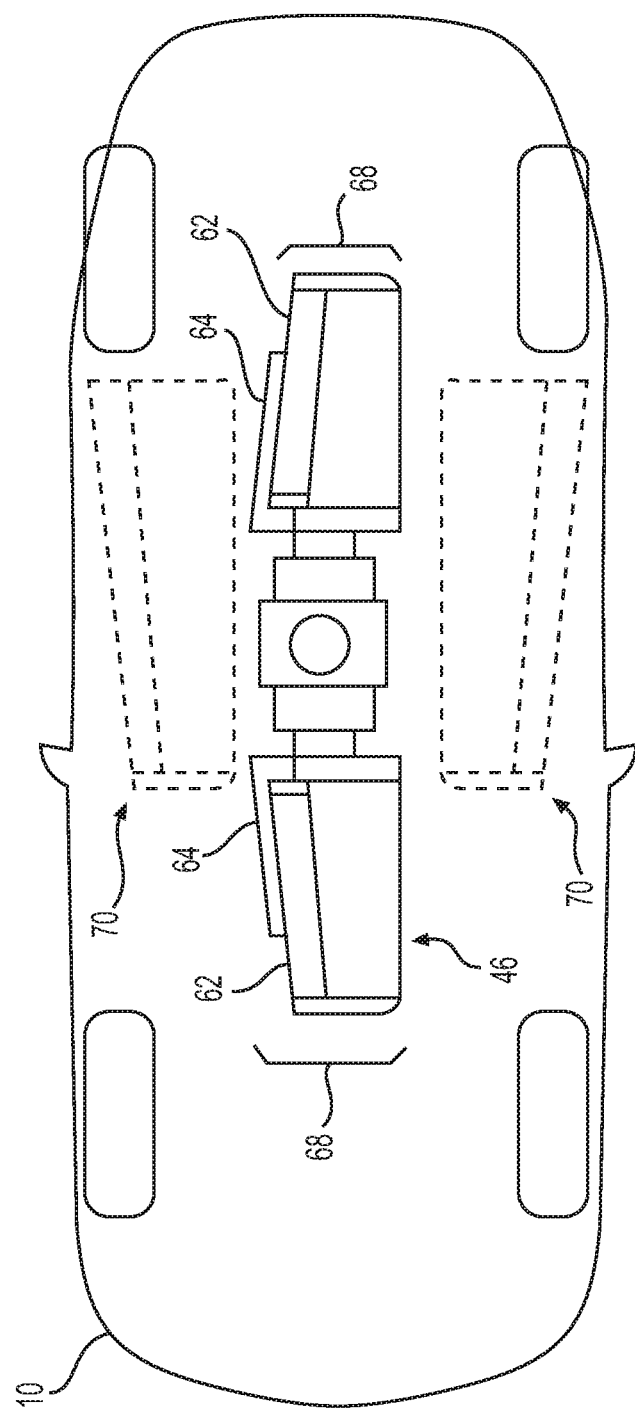
FIG. 7 illustrates an exemplary aeronautical car with other retractable flight system features that are consistent with the present disclosure.

In some embodiments, as shown in FIG. 7 wings 46 may be stored and deployed from underneath aeronautical car 10. For example, instead of folding at a hinged joint, wings 46 may be configured to collapse telescopically such that a first wing section 62 is positioned over or within a second wing section 64 when in a driving mode to allow wings 46 to fit into a compact space below aeronautical car 10. Each wing 46 may also be connected to an actuator 66 that is configured to rotate collapsed wings 46 to a centrally-located driving position 68 underneath aeronautical car 10. During wing deployment, actuator 66 may rotate wings 46 to point outwardly in a lateral direction prior to their extension to a flight position. In other embodiments, each wing 46 may be connected to its own actuator 66 and configured to be separately rotated to a laterally-located driving position 70 underneath aeronautical car 10.

In some embodiments, air-travel system 14 may include features of a coupled vehicle that can be detached from aeronautical car 10 when in a driving mode. For example, air-travel system 14 may include a component or components, such as separate and detachable chassis, frame, and/or body components, that are configured to house components of air-travel system 14 (e.g., propulsion devices 42, flight mechanisms 44, wings 46, etc.). In other words, air-travel system 14 may be a separate component that may be connectable to and detachable from aeronautical car 10. The removable air-travel system 14 may be supported on its own wheels or other traction devices and be autonomously powered or connectable to power source 20 (e.g., via output shaft 40—referring to FIG. 2). A flying mode may be possible when the removable air-travel system 14 is coupled to the car, and a driving mode may be enabled when the removable air-travel system 14 is de-coupled from the car.

One of ordinary skill in the art will recognize that other configurations of air-travel system 14 may be utilized to manipulate aeronautical car 10 without departing from the scope of this disclosure.

Figure 8:
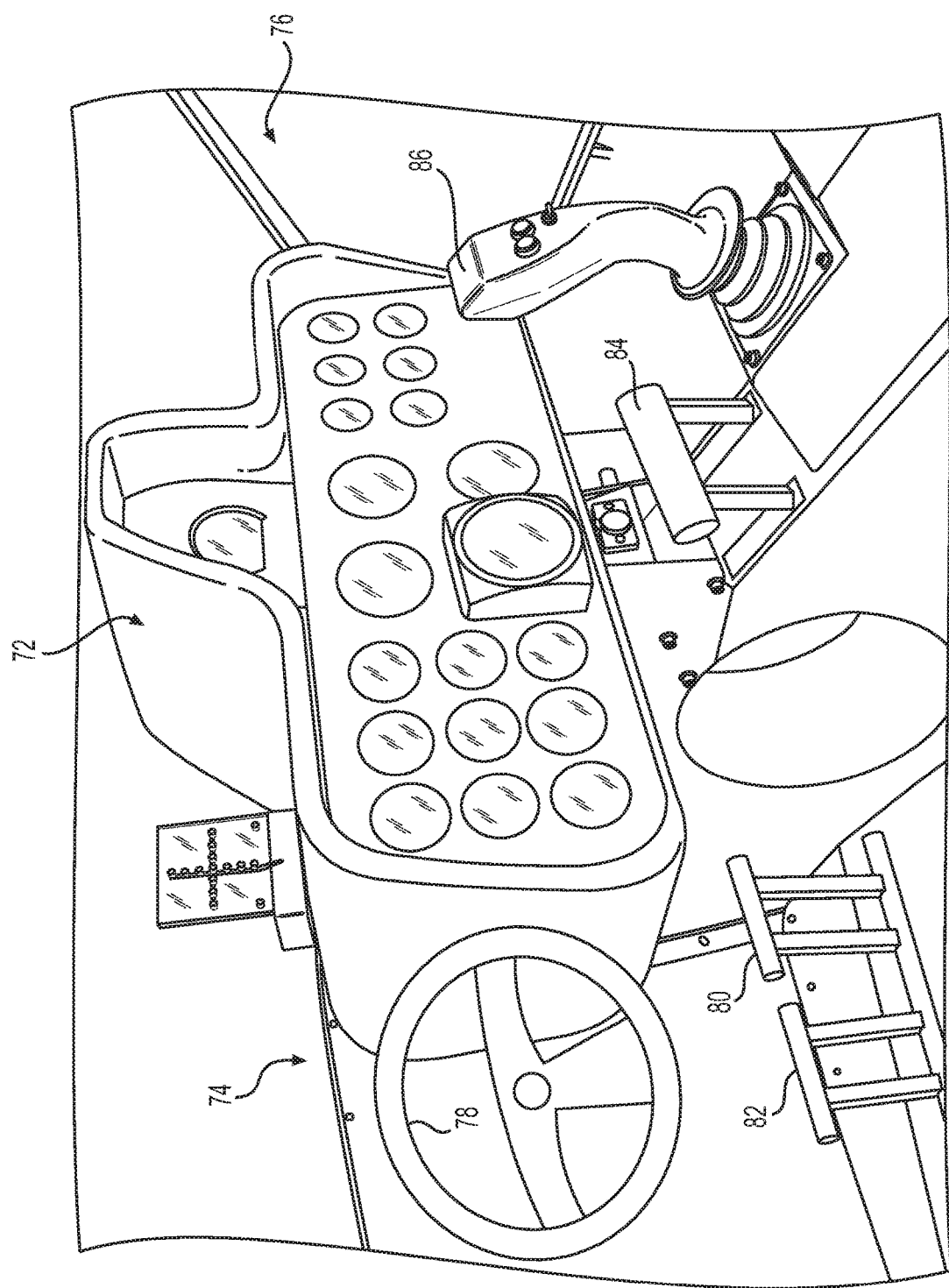
FIG. 8 illustrates an exemplary control system that may be included in an aeronautical car that is consistent with the present disclosure.

As shown in FIG. 8, aeronautical car 10 may have a control system 72 that includes features that allow aeronautical car 10 to be controlled by an operator. For example, control system 72 may include features configured to allow aeronautical car 10 to be operated in both a driving mode and a flying mode.

Control system 72 may include, for example, operator controls for providing input to drive and/or fly aeronautical car 10. For example, control system 72 may include drive mode controls 74 and flight mode controls 76. Drive mode controls 74 may include one or more controls that may be used to accelerate, steer, brake, etc., when aeronautical car 10 is on the ground. For example, drive mode controls may include a steering device 78, accelerator device 80, brake device 82, etc. It is understood that other or additional controls that those mentioned herein may be included to allow aeronautical car 10 to be driven on the ground.

Flight mode controls 76 may include one or more controls that may be used to fly aeronautical car 10 during a flight mode. For example, flight mode controls 76 may include a throttle/thrust lever 84 and a flight control device 86 for adjusting roll, pitch, and yaw (i.e., aileron control, elevator control, and rudder control, respectively). Throttle/thrust lever may be movable in forward and backward directions to control throttle and/or thrust of power source 20 and propulsion devices 42, respectively. Flight control device 86 may be tiltable or rotatable around multiple axes (e.g., x-axis, y-axis, and z-axis), to allow for control along the roll, pitch, and yaw axes of aeronautical car 10. Roll, pitch, and yaw axis control via flight control device 86 may separately correspond to aileron, elevator, and rudder control, respectively. It is understood that flight mode controls 76 may include other or additional control devices than those mentioned herein. For instance, each separate control function of flight control device 86 as described herein (i.e., aileron control, elevator control, and rudder control) may be assigned to separate control devices (e.g., levers, pedals, etc.). It is also understood that the location and form of flight mode controls 76 and drive mode controls 74 may vary from the locations and forms described herein without departing from the scope of this disclosure.

In some embodiments, control system 72 may include one or more control mechanisms that provide input to drive or fly aeronautical car 10, depending whether aeronautical car 10 is in driving or flight mode. For example, steering device 78 that steers aeronautical car 10 on the ground may be configured to also control one or more of roll, pitch, and yaw of aeronautical car 10 during a flight mode. In one example, steering device 78 may also be configured to be pushed forward and pulled backward (with respect to a seated operator) in addition to being rotated left and right so as to allow for aileron and elevator control during flight mode. In another example, accelerator device 80 and braking device 82 may also be configured to accomplish rudder control during flight mode to allow for control of aeronautical car 10 around the yaw axis. To accomplish this dual control functionality for flight mode and driving mode, each component of control system 72 may be configured to receive a mechanical input from the operator and generate a mechanical or electrical output based on the operator's input, which may be interpreted by an associated control module in different ways depending on whether aeronautical car 10 is in driving mode or flight mode. For instance, during driving mode, operator inputs received by steering device 78, accelerator device 80, and braking device 82 may be interpreted by the associated control module as commands to actuate components associated with ground-travel system 12. During flight mode, operator inputs received by steering device 78, accelerator device 80, and braking device 82 may instead be interpreted by the associated control module as commands to actuate components associated with air-travel system 14, as described above.

Control system 72 may also include one or more control features configured to selectively switch aeronautical car 10 between a drive mode and a flight mode. For example, control system 72 may include one or more buttons, switches, or other input devices that, when selected by an operator, generate commands to activate components associated with the selected mode and deactivate components associated with the non-selected mode. For example, control system 72 may be configured to allow for manual or automatic engagement of a mechanism for moving flight mechanisms 44 between a first position (e.g., a driving position) and a second position (e.g., a flight position). That is, control system 72 may include a switch, button, or other feature that, when selected, deploys and/or retracts wings 46, engages or disengages drivetrain 18, engages or disengages propulsion devices, and/or toggles the functionality of multipurpose controls (e.g., steering device 78, accelerator device 80, braking device 82, etc.)

In some embodiments, control system 72 may further include a computing system (not shown). The computing system may include, for example, a processor and a memory device. The processor may be any suitable processor, and may include hardware components, such as circuits, or software components, such as software codes, or a combination of hardware and software components. The memory device may be tangible, non-transitory, volatile, or non-volatile. The memory device may be any suitable memory, such as, for example, a flash memory, a Random Access Memory (RAM), a Dynamic Random Access Memory (DRAM), or a Read-Only Memory (ROM). The memory device may be configured for storing computer instructions, such as software codes. The memory device may also be configured for storing data, such as parameters measured by one or more sensors. The processor may be configured to process the instructions stored in the memory device to perform various functions (e.g., analysis of data). The processor may also be configured to retrieve (e.g., read) data from the memory device and process the retrieved data (e.g., by applying various software codes to analyze the retrieved data).

The computing system may be configured to provide electronic controls to one or more components of aeronautical car 10. For example, the computing system may include a combination of a car electronic control unit and an airplane electronic control unit. The computing system may be configured, for example, to convert signals from driving mode controls 32 and flight mode controls 34 into commands for manipulation of one or more components of ground-travel system 12 and/or air-travel system 14, such as to drive and/or fly aeronautical car 10.

According to some embodiments, the computing system may include software, data structures, and/or systems enabling other functionality. For example, the computing system may include software allowing for automatic pilot control of aeronautical car 10. Automatic pilot control may include any functions configured to automatically maintain a preset course and/or perform other navigation functions independent of an operator of aeronautical car 10 (e.g., stabilizing, preventing undesirable maneuvers, automatic landing, etc.). For example, the computing system may receive information from an operator of aeronautical car 10 including a flight plan and/or destination information. The computing system may use such information in conjunction with autopilot software for determining appropriate commands to propulsion device(s) 22 for purposes of navigating aeronautical car 10 according to the information provided.

In some embodiments, control system 72 may include one or more control features that may allow for unmanned flight of aeronautical car 10. For example, control system 72 may include a remotely-controlled computing system (e.g., such as to allow aeronautical car 10 to be driven and/or flown remotely through user operation of a remote controller). In another example, control system 72 may include an autonomous computing system configured to drive and/or fly aeronautical car 10 based on collected data, such as sensor input.

FIGS. 9-14 illustrate an exemplary aeronautical car 10 for weather manipulation that is consistent with the present disclosure. Aeronautical car 10 of FIGS. 9-14 may include features described above in addition to features described below. Among other things, aeronautical car 10 may be used for moving clouds from one region to another, thereby achieving the goal of manipulating or at least affecting the weather at both regions. For instance, it may be desirable to move clouds from a region where rainfall is excessive to a dry region where rainfall is scarce. Relocating clouds may affect the distribution of precipitation, such that flooding in a precipitation-rich region can be reduced, and drought in a dry region can be improved. As another example, it may be desirable to move clouds to a region of sky, for instance, over a parade or sport event taking place on a hot day to provide shade and protect participants and spectators from excessive heat or damaging effects of the sun's rays.

Figure 9:
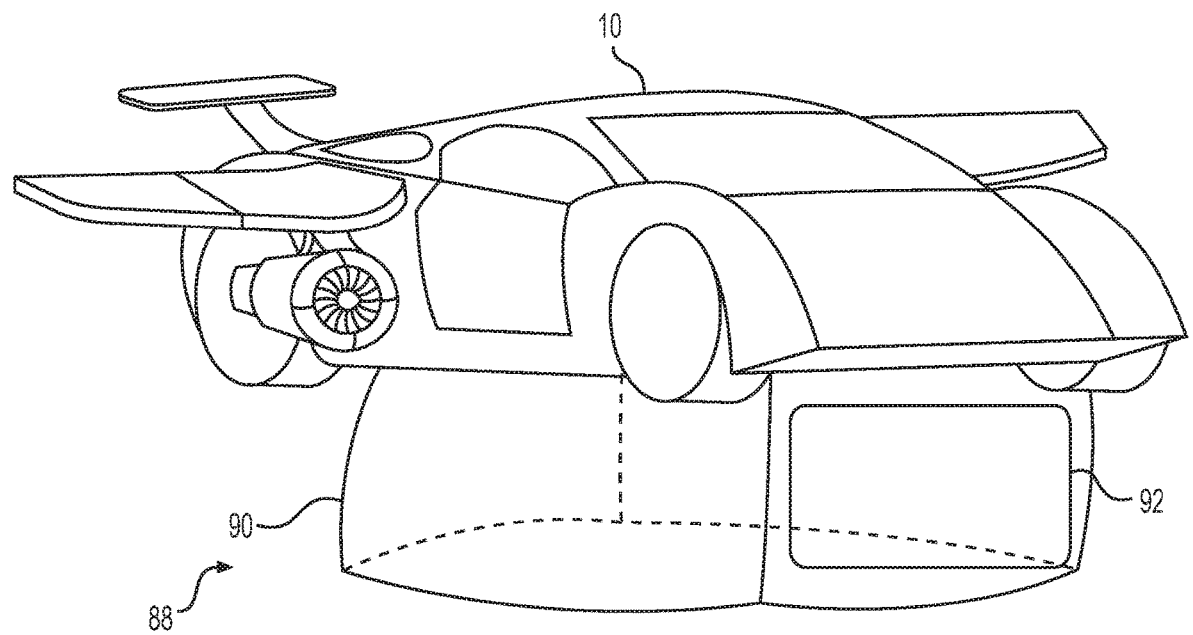
FIGS. 9 and 10 illustrate an exemplary aeronautical car with features for weather manipulation that are consistent with the present disclosure.
Figure 10:
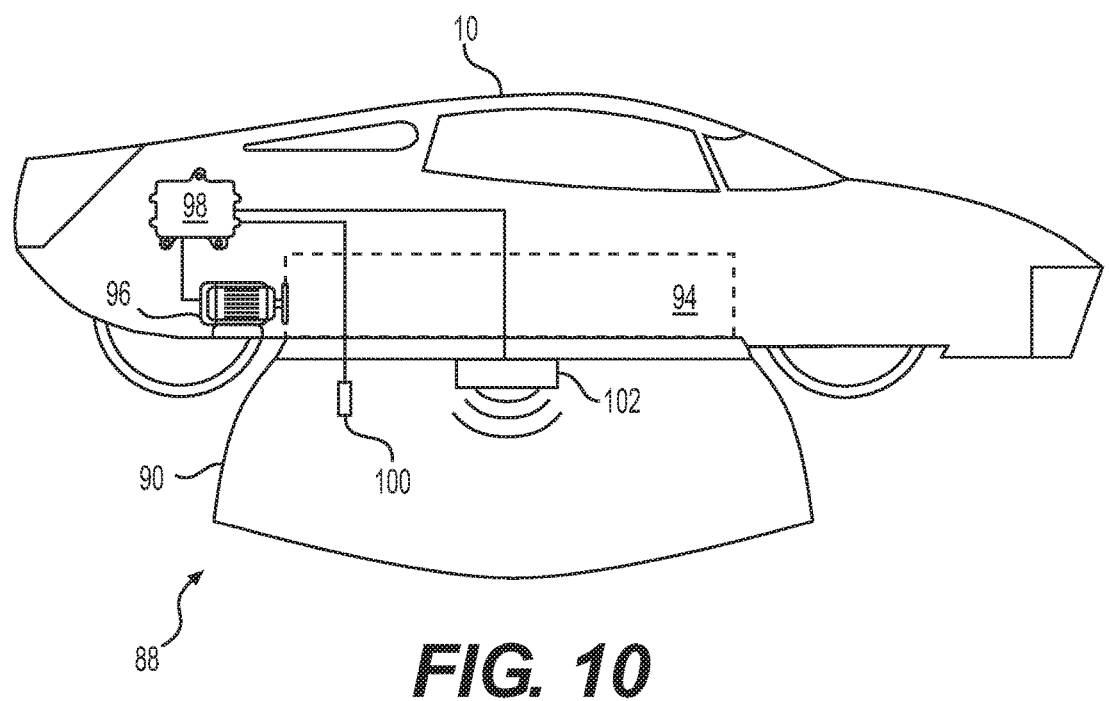

For the application of manipulating weather, and specifically, for moving clouds, aeronautical car 10 may include a weather manipulation system 88 that includes a container 90 for capturing and transporting a cloud, as shown in FIGS. 9 and 10. Container 90 may be any suitable shape, such as a rectangular cuboid shape, a cylindrical shape, or another shape. Container 90 may be an enclosure and include an opening 92 into the enclosure. When deployed, container 90 may be positioned such that opening 92 faces a lateral side of container 90, such as a front, rear, left, or right side (e.g., such that aeronautical car 10 may move horizontally to capture a cloud). It should be understood, however, that other configurations are possible (e.g., the opening may face upwardly or downwardly, etc.).

Container 90 may be constructed from at least one lightweight material, such as carbon fiber, aluminum, a polymer or other type of fabric, a metal/alloy film, a plastic, a foam, etc. Container 90 may be retractable and when not in use may be stored in a compartment 94 located near a bottom side of aeronautical car 10 (or another compartment of aeronautical car 10), as shown in FIG. 10. Compartment 94 may include a hatch that is configured to be opened on command to deploy container 90 and closed when container 90 is stowed within compartment 94.

To capture a cloud, the hatch of compartment 94 may be opened to allow container 90 to be deployed. An actuator 96 associated with weather manipulation system 88 may be configured to help deploy container 90 and contain a captured cloud. For example, actuator 96 may be a compressed air system that is configured to inflate a portion of container 90 that serves a structural element to maintain the shape of container 90. When the structural portion is inflated, container 90 may hold its shape. Container 90 may include a number of valves associated with the structural portion and governed by a controller 98 that are configured to allow compressed air to selectively open and close opening 92 by evacuating and admitting compressed air in passages around the opening. Container 90 may also or alternatively include a number of electromagnets that are configured to help open and close opening 90 when energized.

In another embodiment, container 90 may include a lightweight frame around its perimeter that is formed of material having properties that allow its shape to be remotely controlled, such as a shape memory alloy (SMA). The SMA frame may be provided with an initial shape for capturing clouds such that when the SMA is heated or when an electrical current applied to it, the SMA returns to that original shape. In this way, heat or an electrical current may be applied to the SMA frame to cause container 90 to assume and hold its original shape during cloud collection. When the SMA frame is cooled, such as when container 90 is stored, the SMA frame may be easily collapsible and retractable into compartment 94 by actuator 96. Opening 92 may also include a dedicated portion of SMA to allow opening 92 to be closed or opened on command by controlling a flow of current (or other heat source) to the SMA around opening 92. It is understood that other mechanisms for deploying container 90 than those discussed herein may be used.

In some embodiments, container 90 may include a climate control system configured to adjust the air condition within container 90 for suitable cloud storage. The climate control system may include various devices for controlling the air condition within container 90, such as the temperature and humidity within container 90. For example, the climate control system may include at least one sensor 100 configured to detect one or more air parameters, such as the temperature and/or humidity of the air within container 90. The climate control system may also include a conditioning device 102, such as an air conditioner, a humidifier, a dehumidifier, a heater, etc., for adjusting the air condition within container 90 based on detected parameters (e.g., temperature and humidity) measured by sensor 100. The climate control system may be configured to automatically adjust the condition of the air within container 90 while a cloud is being transported from one region to another, such that the cloud remains as a condensed water vapor, rather than being evaporated or condensed into water. The climate control system may also include other sensors, such as a sensor that measures water droplet concentration within a cloud. It is understood that the climate control system may include additional or other sensory equipment In use, aeronautical car 10 may be driven to a region where a cloud is located. Aeronautical car 10 may be flown to approach the cloud and capture the cloud in container 90. Aeronautical car 10 may transport the cloud to a destination region using container 90. The climate control system may adjust the air condition within container 90 such that the cloud remains a condensed water vapor. After the cloud is transported to the destination region within the container aeronautical car 10 may be maneuvered such that the cloud is released from container 90. In some embodiments, multiple sides of container 90 may include an opening or otherwise be openable to facilitate releasing the transported cloud. In addition, although not shown, a fan or other such device may be provided within container 90 to facilitate the release of the cloud. After the cloud is released, container 90 may be returned to compartment 94, and compartment 94 may be closed. Aeronautical car 10 may travel back and forth between regions to move as many clouds as needed.

Figure 11:
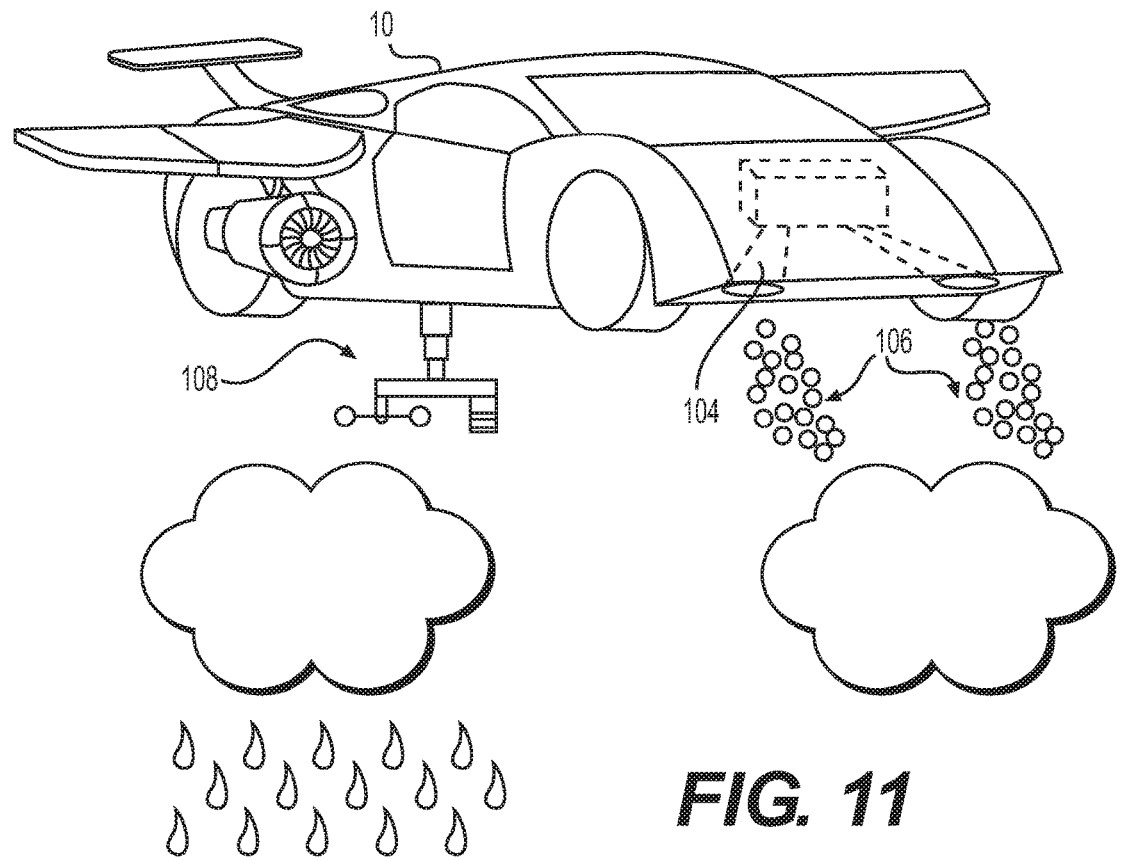
FIGS. 11 and 12 illustrate an exemplary aeronautical car with other features for weather manipulation that are consistent with the present disclosure.
Figure 12:
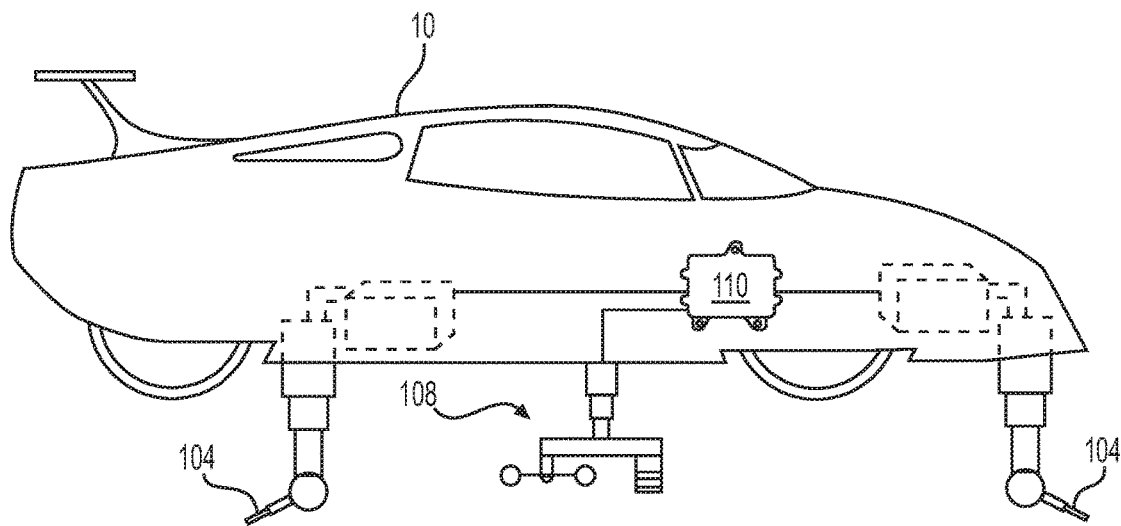

FIGS. 11 and 12 illustrate an exemplary aeronautical car 10 for weather manipulation consistent with the disclosed embodiments that may be used for cloud seeding and may include one or more features discussed above. Existing technologies for cloud seeding suffer from various shortcomings, including the lack of ease of maneuverability, difficult ground transport, and short flight time capabilities. Aeronautical car 10 overcomes these shortcomings.

Aeronautical car 10 may include a weather manipulation device, such as a nozzle 104 mounted on aeronautical car 10 for spreading cloud seeding materials 106, such as silver iodide (AgI), aluminum oxide, and/or barium, to a cloud. Aeronautical car 10 may include a sensing system 108 configured to measure parameters that reflect the conditions of a cloud, which may be used in generating cloud seeding strategies. Sensing system 108 may include various sensors, such as at least one of a temperature sensor, a humidity sensor, or a water droplet size or amount sensor, etc., that are configured to measure various parameters associated with the cloud. Sensing system 108 may be connected to an actuator and selectively deployable from a compartment within aeronautical car 10. For example, sensing system 108 may be deployable and retractable via a telescopic, hinged, or tethered actuator.

Measured parameters collected by sensing system 108 and/or other information may be sent off-board to other devices (e.g., computers) for further processing. For example, aeronautical car 10 may further include an onboard controller 110 (shown in FIG. 12) and one or more communication devices (e.g., transmitter, antenna, etc.—not shown) configured to communicate data with an off-board entity, such as a ground-based control center. Aeronautical car 10 may similarly receive processing results from the off-board entity, which may be used onboard (e.g., by control system 72—referring to FIG. 8) in controlling the application of cloud seeding materials 106.

As shown in FIG. 12, an onboard controller 110 may be electronically connected to one or more nozzles 104 and sensing system 108 through at least one of a wired connection or a wireless connection system. Parameters measured by sensing system 108 may be transmitted to onboard controller 110 and stored therein in an associated memory device. Onboard controller 110 may also include a processor and be configured to analyze the measured parameters to determine the conditions of clouds. Controller 110 may be configured to compare the determined conditions of a cloud to parameter thresholds stored within its memory and determine whether the cloud is a candidate for seeding. That is, if the determined conditions of the cloud satisfy parameter threshold criteria (e.g., threshold temperature, humidity, water droplet size or amount, and/or other criteria), onboard controller 110 may control nozzle 104 to distribute or spread cloud seeding materials to the cloud. If onboard controller 110 determines that the conditions of a cloud do not satisfy the threshold criteria for cloud seeding (e.g., the temperature, humidity, and/or water droplet size do not satisfy their respective threshold values), the cloud may not be a proper candidate for cloud seeding and onboard controller 110 may not activate nozzle 104 to distribute or spread cloud seeding materials to the cloud.

For cloud seeding applications, aeronautical car 10 may be flown to an area of the sky where clouds are located and may be maneuvered through the sky above, near, or within the clouds. Aeronautical car 10 may periodically or continuously measure parameters reflecting the conditions of the clouds using sensing system 108. That is, aeronautical car 10 may measure cloud parameters in real-time to allow for quick identification of clouds that are suitable for seeding. When onboard controller 110 determines, based on the analysis of the measured parameters, that a cloud is ready for cloud seeding, onboard controller 110 may control nozzle 104 to spread cloud seeding materials 106 to the cloud.

Because aeronautical car 10 is compact and easily maneuverable, cloud seeding materials 106 may be distributed to the cloud in an accurate and efficient way. For example, it is understood that a cloud may be formed of a plurality of small cloud patches, which may or may not be evenly distributed within the cloud. The conditions of each cloud patch may be different, such that the desired distribution of cloud seeding material 106 may not be uniform across the whole cloud. To more effectively carry out cloud seeding procedures, onboard controller 110 may control nozzle 104 to selectively distribute cloud seeding materials to each cloud patch based on an analysis of the parameters associated with each respective cloud patch. For example, onboard controller 110 may control nozzle 104 to distribute cloud seeding materials 106 in a non-uniform pattern when cloud patches are distributed non-evenly within the cloud. In some situations, onboard controller 110 may control nozzle 104 to distribute cloud seeding materials 106 to some but not all cloud patches within the cloud.

Figure 13:
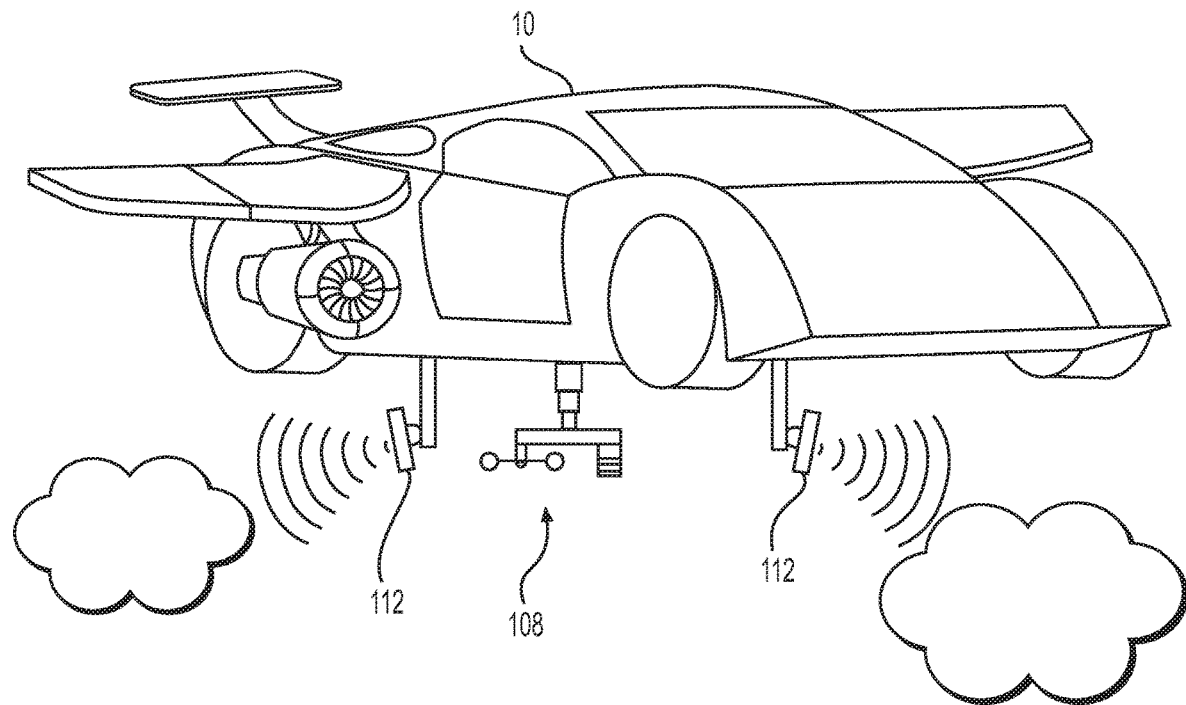
FIGS. 13 and 14 illustrate an exemplary aeronautical car with other features for weather manipulation that are consistent with the present disclosure.
Figure 14:
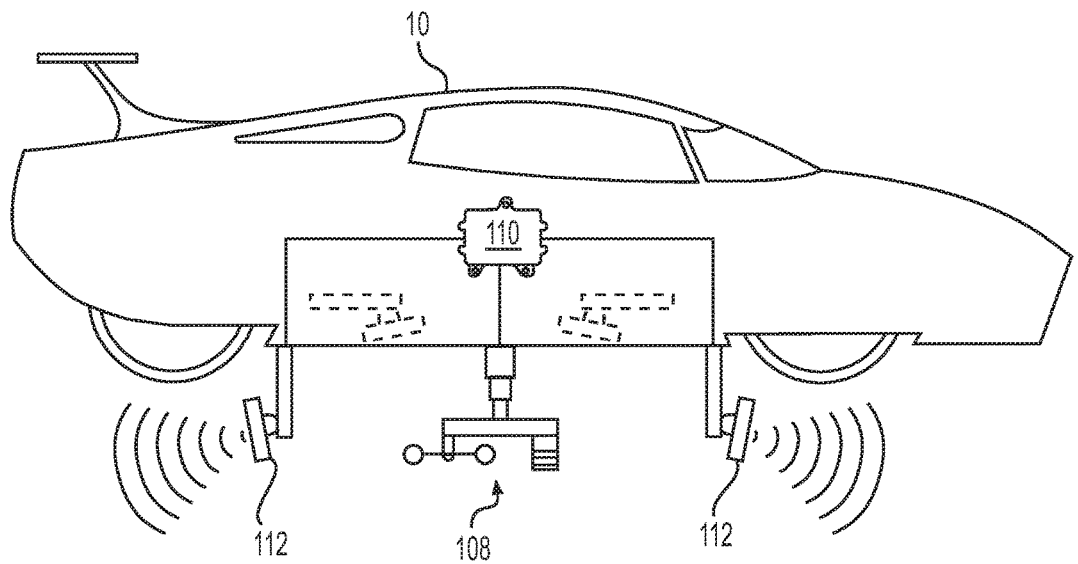

FIGS. 13-14 illustrate an exemplary aeronautical car 10 for weather manipulation consistent with the disclosed embodiments that may be used to interfere with the formation of hazardous weather, such as a storm (e.g., a rain or snow storm, a tropical storm, a hurricane, a tornado, and a hail storm, etc.). Aeronautical car 10 may include a weather manipulation device, such as a storm interference system that includes sensing system 108, onboard controller 110, and a plurality of storm interference devices 112. The plurality of storm interference devices 112 may be mounted to a body, frame, or chassis of aeronautical car 10 and may be deployable from and retractable to a storage compartment.

Storm interference devices 112 may be configured to generate waves of energy at certain frequencies and direct the waves of energy toward clouds for interfering with the formation of a storm. Storm interference devices 112 may include a wave generator configured to generate a wave of energy at a selected frequency or a frequency spectrum. For example, the wave generator may be configured to generate microwaves at one or more microwave frequencies within the range of 300 MHz to 300 GHz. Microwaves may be directed toward a cloud to heat the water droplets, causing the water droplets to evaporate and be reduced in sizes. Reducing the sizes of the water droplets may interfere, disrupt, or prevent the formation of at least some types of storms. In some embodiments, the wave generator may generate other types of waves, such as a shock wave (e.g., an abrupt, pulsed wave) to break the ice or hail formed within a cloud, thereby reducing the severity or preventing the formation of the storms. In some embodiments, interference devices 112 may include laser devices (not shown separately) configured to emit a laser light that may be directed at a cloud to heat the cloud. Increasing the temperature of the cloud may interfere with the aggregation of the water droplets suspended therein, thereby interfering, disrupting, or preventing the formation of storms. Because aeronautical car 10 is compact and may quickly and easily maneuver throughout the clouds, storm interference technologies may be accurately applied to targeted clouds.

Sensing system 108 may be configured to measure various parameters associated with clouds, thereby enabling real-time monitoring of the conditions of the clouds. For example, sensing system 108 may include one or more sensors configured to periodically or continuously measure one or more of the temperature, humidity, and/or the size and amount of water droplets of clouds. In addition, sensing system 108 may include other devices, such as radar, thermographic imaging sensors, infrared sensors, etc., for measuring other parameters (e.g., movement of the clouds, thermal pattern of the clouds, etc.) indicating the conditions of the clouds. Parameters measured by sensing system 108 may be transmitted to onboard controller 110 and stored within its associated memory and/or directly processed by its associated processor. Onboard controller 108 may analyze the parameters measured by sensing system 108 to determine the conditions of the clouds and the status of storm formation. Based on the analysis, onboard controller 110 may be configured to selectively identify certain clouds for applying the storm interference technologies, such that storm interference may be achieved accurately and efficiently. For example, onboard controller 110 may select one cloud over another cloud, and may control interference devices 112 to generate and apply energy waves toward only the selected cloud. In addition, based on the analysis of the measured parameters, onboard controller 110 may determine wave parameters (e.g., the frequency and amplitude) of the energy waves to be generated and applied to the cloud. Because aeronautical car 10 is easily maneuverable and compact, storm interference technologies may be more accurately and efficiently applied to storm-forming clouds.

The disclosed aeronautical cars may be used in a variety of applications for weather manipulation. For example, the disclosed aeronautical cars may be used for climate control over a small area, such as a football stadium, by using one or more aeronautical car. The disclosed aeronautical cars may be used for climate control over a large area by using a plurality of aeronautical cars. The disclosed aeronautical cars may also be used over all terrains, including the sky over deserts or high mountains, where transportation of existing precipitation-making devices, such as rockets, cannons, or ground-based cloud seeding generators, may be challenging.

Because aeronautical cars are compact, they may easily maneuver around the sky to utilize weather manipulation technology. As a result, accuracy and efficiency in weather manipulation may be improved. Moreover, because the disclosed aeronautical cars include a solar energy system and thus can be operated with a self-sustaining power supply for a relatively long time (e.g., several days, weeks, or even months), continuous and effective weather manipulation may be achieved.

The foregoing description has been presented for purposes of illustration. It is not exhaustive and is not limited to the precise forms or examples disclosed. Modifications and adaptations will be apparent to those skilled in the art from consideration of the specification and practice of the disclosed examples. The examples shown in the figures are not mutually exclusive. Features included in one example shown in one figure may also be included in other examples shown in other figures.

It will be apparent to those skilled in the art that various modifications and variations can be made in the disclosed aeronautical cars for weather manipulation. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. An aeronautical car, comprising:
  a ground-travel system including a drivetrain;
  an air-travel system including:
    a detachable portion configured to house a propulsion device configured to provide thrust and to be driven by the drivetrain when the detachable portion is connected to the aeronautical car;
    at least one flight mechanism configured to provide lift once the aeronautical car is in motion;
    a horizontal stabilizer; and
    a vertical stabilizer, wherein the horizontal stabilizer and the vertical stabilizer are configured to slide into and out of a compartment of the aeronautical car.

2. The aeronautical car of claim 1, wherein the drivetrain comprises a clutch, transmission, transfer case, drive shaft, and differential.

3. The aeronautical car of claim 1, further comprising a four-wheel drive system powered by the drivetrain.

4. The aeronautical car of claim 1, wherein the drivetrain is powered by a reciprocating piston engine, a rotary engine, or a turbine engine.

5. The aeronautical car of claim 1, wherein:
  the ground travel system comprises a combustion engine and a drive motor;
  the combustion engine burns a mixture of air and fuel; and
  the drive motor is powered by an electrical power system including at least one electrical storage device.

6. The aeronautical car of claim 1, further comprising:
  a solar energy system configured to directly supply energy to a drive motor.

7. The aeronautical car of claim 1, further comprising:
  an emission abatement system;
  an exterior lighting system; and
  a passenger restraint system.

8. The aeronautical car of claim 1, wherein the propulsion device includes a pulse jet.

9. The aeronautical car of claim 1, wherein the propulsion device is able to be tilted, rotated, and turned.

10. The aeronautical car of claim 1, wherein the propulsion device is configured to provide vertical thrust for vertical takeoff.

11. The aeronautical car of claim 1, further comprising:
  a plurality of propulsion devices, wherein at least one propulsion device is positioned on a left side, a right side, a front side, or a rear side of the aeronautical car.

12. The aeronautical car of claim 1, wherein the propulsion device includes adjustable airfoil components adjustable to reverse thrust.

13. The aeronautical car of claim 1, further comprising:
  air shields moveable between a storage position within a compartment of the aeronautical car and a flight position blocking airflow into wheel wells of the aeronautical car.

14. The aeronautical car of claim 1, further comprising:
  at least one wing; and
  at least one actuator configured to position the at least one wing underneath the aeronautical car.

15. The aeronautical car of claim 1, further comprising:
  a steering device configured to steer the aeronautical car when the aeronautical car is on the ground and also control at least one of roll, pitch, or yaw of the aeronautical car when the aeronautical car is in flight.

16. The aeronautical car of claim 1, further comprising a weather manipulation device configured to manipulate at least one aspect of a weather condition while the aeronautical car is in the air.

17. The aeronautical car of claim 16, wherein the weather manipulation device includes a container and a climate control system configured to adjust an air condition within the container for suitable cloud storage.

18. The aeronautical car of claim 17, wherein the container is retractable and stored in a compartment when not in use.

19. The aeronautical car of claim 1, further comprising:
a storm interference device including a wave generator configured to generate microwaves at a microwave frequency between 300 MHz and 300 GHz.

* * * * *